(12) United States Patent
Sawyer

(10) Patent No.: US 7,385,725 B1
(45) Date of Patent: Jun. 10, 2008

(54) PREVIEWING AN IMAGE RENDERED ON MULTIPLE PAGES

(75) Inventor: David Sawyer, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1033 days.

(21) Appl. No.: 10/406,332

(22) Filed: Apr. 2, 2003

(51) Int. Cl.
*G06F 15/00* (2006.01)

(52) U.S. Cl. .................... 358/1.18; 358/1.2; 358/450; 345/629; 345/660; 345/661; 715/274

(58) Field of Classification Search ................ 358/1.2, 358/1.18, 402, 450; 345/629, 660, 661; 715/274
See application file for complete search history.

(56) References Cited

U.S. PATENT DOCUMENTS

| | | | |
|---|---|---|---|
| 5,951,174 A * | 9/1999 | Handa | 400/120.01 |
| 7,064,858 B2 * | 6/2006 | Iwai et al. | 358/1.2 |
| 7,065,716 B1 * | 6/2006 | Rzepkowski et al. | 715/839 |
| 2003/0044200 A1 * | 3/2003 | Connors | 399/182 |
| 2003/0202211 A1 * | 10/2003 | Yudasaka et al. | 358/1.18 |

\* cited by examiner

*Primary Examiner*—Twyler Lamb Haskins
*Assistant Examiner*—Mark R. Milia
(74) *Attorney, Agent, or Firm*—Fish & Richardson P.C.

(57) ABSTRACT

Methods and apparatus, including computer program products, for previewing images to be rendered on multiple pages. A representation of the image mapped onto a two dimensional canvas is displayed. The canvas representation includes content of the image and describes a layout of the image content across multiple pages.

21 Claims, 4 Drawing Sheets

PREVIEWING AN IMAGE RENDERED ON MULTIPLE PAGES

BACKGROUND

The present invention relates to rendering images on multiple pages.

Applications that support printing electronic images often include the ability to print an image that is too large to fit on a single page using multiple pages. These pages can then be assembled by a user to produce a printed image. The printed pages can include cut marks and alignment marks to facilitate the assembly of the printed image. Cut marks are used to indicate regions of the printed pages that must be removed before assembly. These regions typically include unprintable regions of the page that cannot be used by the printer. Alignment marks are used as a guide to align the multiple pages during assembly.

SUMMARY OF THE INVENTION

The present invention provides methods and apparatus, including computer program products, for previewing images to be rendered on multiple pages.

In general, in one aspect, the invention provides methods and apparatus, including computer program products, for previewing an image mapped onto a two dimensional canvas to be rendered on multiple pages, the canvas being bigger than a page of the multiple pages in both horizontal and vertical dimensions. The techniques include displaying a representation of the canvas, the canvas representation including content of the image and describing a layout of the image content across multiple pages.

Advantageous implementations of the invention include one or more of the following features. Displaying a representation of the canvas can include displaying the horizontal and vertical dimensions of the canvas. Displaying a representation of the canvas can include displaying a representation of a page of the multiple pages, the page representation including a portion of the image content and describing how the portion of the image content will be rendered on the page. The page representation can identify one or more unprintable regions of the page. The page representation can include one or more marks indicating how to combine the rendered page with one or more rendered pages associated with other portions of the image content. The one or more marks can include cut marks, slugs, or alignment marks. User input selecting a region of the canvas representation can be received in a user interface and a representation of a page associated with the selected region can be displayed.

The invention can be implemented to realize one or more of the following advantages. The preview of the image can show where the different elements of the image content will appear on the printed pages. The preview of the image can show unprintable regions and overlap regions of the printed page.

The details of one or more implementations of the invention are set forth in the accompanying drawings and the description below. Further features, aspects, and advantages of the invention will become apparent from the description, the drawings, and the claims.

DETAILED DESCRIPTION

Figure 1:
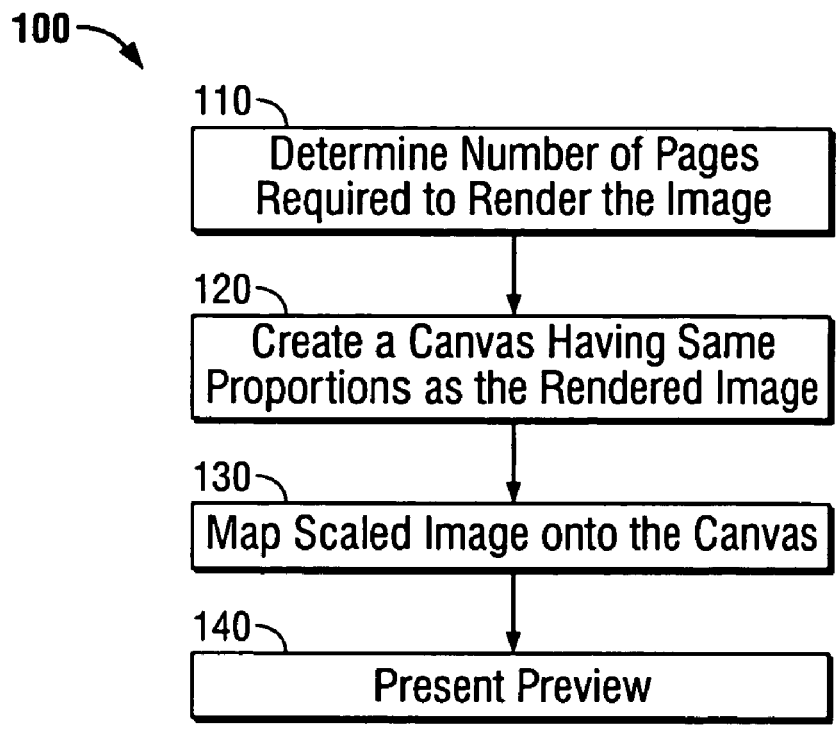
FIG. 1 is a flow chart illustrating a method for previewing an image to be rendered on multiple pages.

FIG. 1 illustrates a method 100 for previewing an image to be rendered on multiple pages. An image is a collection of graphical elements representing graphics, text, line art and the like, and can be obtained from any source. Images include vector images and raster images. In a vector image, the elements of the image are defined mathematically as lines or curves and can have solid, gradient or patterned color fills. A raster image is a bitmapped image composed of a grid of pixels. The number of pages that will be required to render the image is determined (step 110). The determined number of pages can be the number of pages that will be required to render the image in a particular format, such as portrait or landscape formats. The determined number of pages can be the number of pages required to print the image at a given scale. In one implementation, the user can specify the format and the scale used to print the image. In another implementation, the system can select the format that will require the smallest number of pages. The system can also determine the largest scale factor that can be used if the image is to be printed using a specified number of pages in a specified format. The number of pages required to render the image and the format of the pages is used to generate a two dimensional canvas having the correct proportions (step 120). The image is mapped onto the canvas (step 130) and a preview image of the canvas is displayed (step 140). The preview image of the canvas displays how the image will be printed using multiple pages. The preview image shows how the image content will be positioned on the pages and displays the location and size of any white space on the pages.

Figure 2:
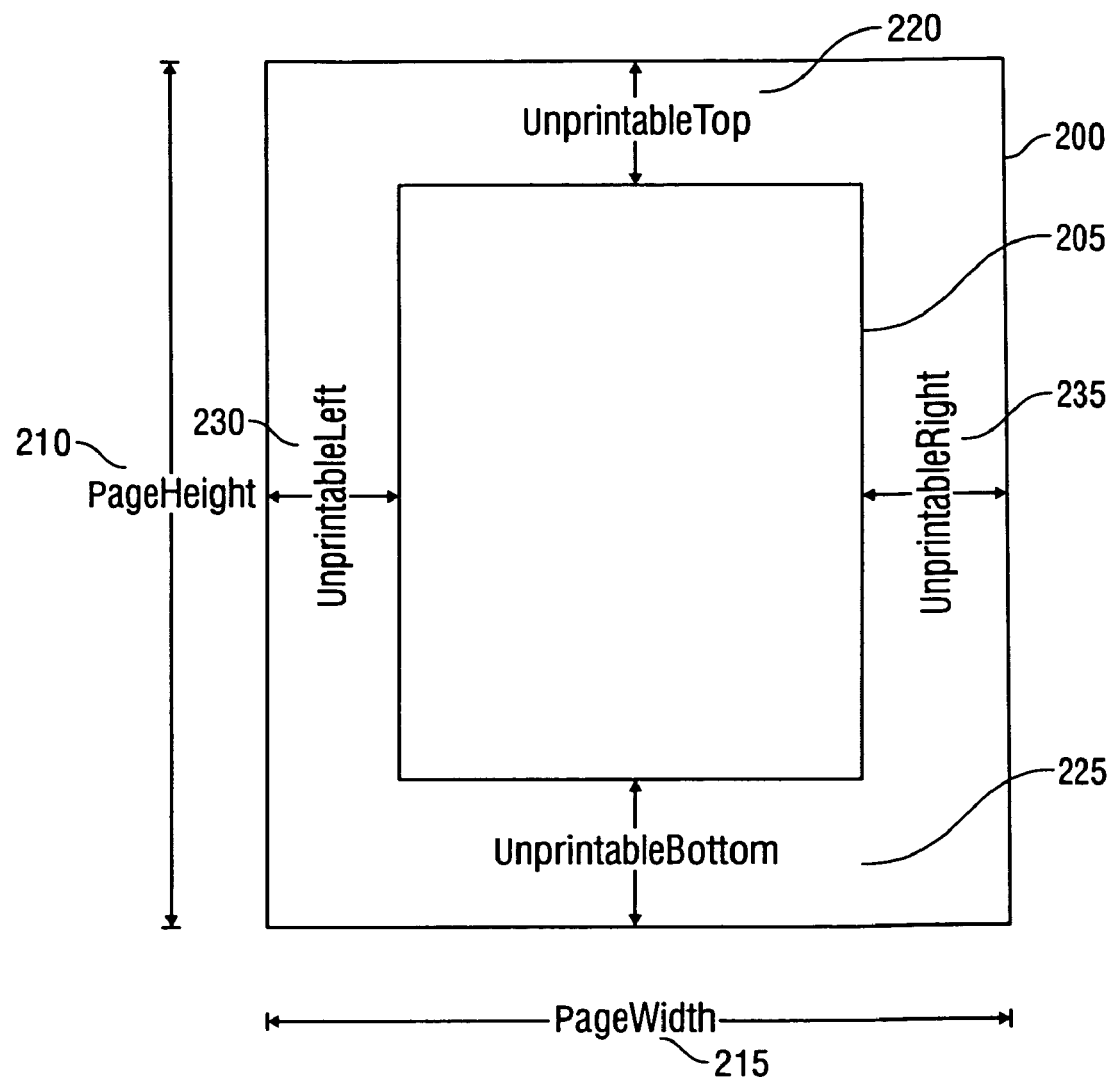
FIG. 2 illustrates the parameters used to describe the physical characteristics of a page.

FIG. 2 illustrates a set of parameters that can be used to describe the physical characteristics of a page. The dimensions of the page 200 are represented by a pageHeight 210 and pageWidth 215. The printable region 205 of the page 200 represents the portion of the page that can be used to render the image e.g., the portion of a sheet of paper that can be used by a particular printer to print the document. The area of the page 200 that is outside the printable region 205 describes the region that cannot be used by a printer. The printable region 205 can be defined by specifying the dimensions of an unprintable border. The parameters unprintableTop 220 and unprintableBottom 225 describe the portions of the page along the top and bottom edge that cannot be used. The parameters unprintableLeft 230 and unprintableRight 235 describe the portions of the page along the left and right edge that cannot be used.

The printed pages can also include an overlap region between pages. The overlap region is a portion of the printable region for a page that is used to repeat image data from an adjacent page. The parameters overlapX and overlapY describe the horizontal and vertical overlap for each page. In one implementation, where the image is to be rendered by printing it on physical pages (e.g., sheets of paper), the overlap regions can make it easier to cut and align individual pages to assemble the scaled image because the cuts do not have to be exact.

The number of pages required to render the image can be determined by multiplying the number of pages required in the horizontal direction with the number of pages required in the vertical dimension. A scale factor used to scale the image can be specified by the parameter imageScale. Listing 1 illustrates pseudo code for a method of calculating the number of pages in the horizontal dimension, described using the parameter columns, which will be required to render the scaled image. All divisions in Listing 1 are integer divisions.

Listing 1:

```
columns = 1;
scaledWidth = imageWidth * imageScale;
imageableWidth = pageWidth - unprintableLeft -
                               unprintableRight;
if (scaledWidth > imageableWidth)
    columns = 1 + ((scaledWidth - imageableWidth - 1) /
                  (imageableWidth - overlapX)) + 1;
```

Listing 2 illustrates pseudo code for a method of calculating the number of pages in the vertical dimension, described using the parameter rows, that are required to render the scaled image. All the divisions in Listing 2 are integer divisions.

Listing 2:

```
rows = 1;
scaledHeight = imageHeight * imageScale;
imageableHeight = pageHeight - unprintableBottom -
                                unprintableTop;
if (scaledHeight > imageableHeight)
    columns = 1 +
              ((scaledHeight - imageableHeight - 1) /
              (imageableHeight - overlapY)) + 1;
```

The calculations described by the pseudo code in Listing 1 and Listing 2 are performed for both portrait and landscape format in order to determine the number of pages required for each format.

Figure 3:
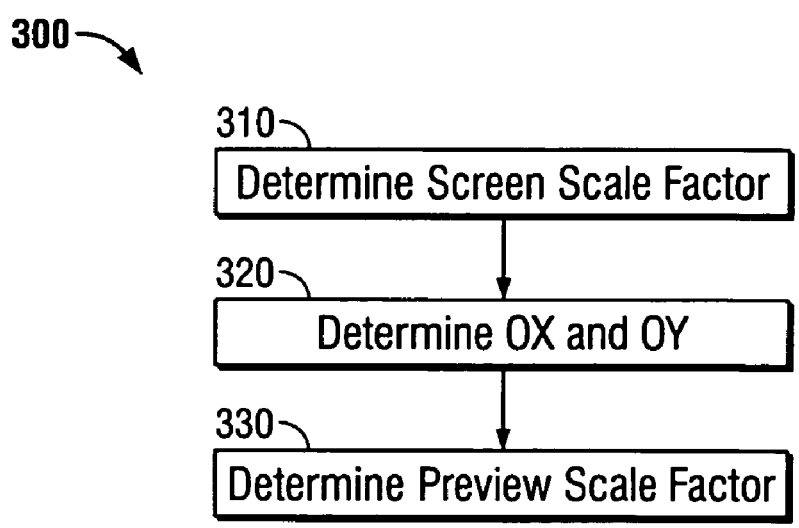
FIG. 3 is a flow diagram illustrating a method of calculating a preview scale factor that can be applied to the scaled image to generate a preview of the image mapped onto a two dimensional canvas.

FIG. 3 illustrates a method 300 of calculating a preview scale factor that can be applied to the scaled image to generate the preview image. The preview image is displayed on the screen using a canvas. The width to height ratio of the canvas is same as the ratio between (pagewidth*rows) and (pageHeight*columns). The screen scale factor, specified by the parameter screenScale, is obtained by determining the scale factor required to scale one page to fit in the canvas (step 310). If there is no overlap, the preview scale factor is obtained by multiplying screenScale with imageScale. If there is overlap, the preview scale factor obtained by multiplying screenScale with imageScale is modified based on the horizontal overlap scale factor $O_x$ and vertical overlap scale factor $O_y$ so that the scaled image takes up the correct proportion of the canvas (step 320). The preview scale factor, $O_x$ and $O_y$ can be determined using the pseudo code in Listing 3. The division operations in Listing 3 are floating point divisions.

Listing 3:

```
FLOAT ox, oy;
Ox = (FLOAT) imageablewidth / (FLOAT) (imageablewidth -
                                       overlapX);
Ox = (1.0 + Ox * (columns -1)) / (FLOAT) columns;
```

-continued

```
Oy = (FLOAT) imageableHeight / (FLOAT) (imageableHeight -
                                        overlapY);
Oy = (1.0 + Oy * (rows -1)) / (FLOAT) rows;
preview scale factor = screenScale * imageScale * min(Ox, Oy);
```

Figure 4:
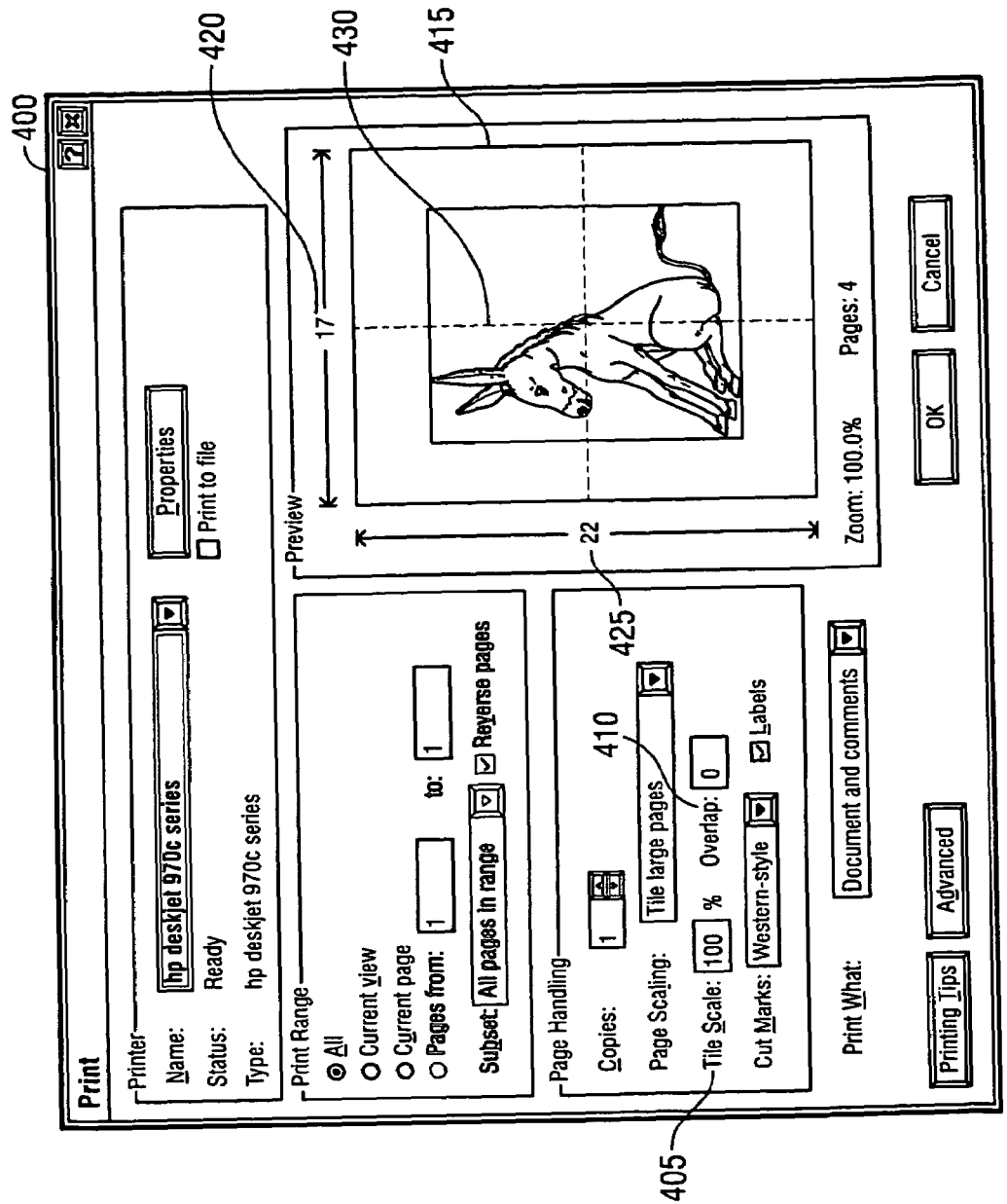
FIG. 4 illustrates a user interface of an exemplary print preview tool showing a preview of the canvas to be printed on multiple pages.

FIG. 4 illustrates a user interface 400 of an exemplary print preview tool according to one aspect of the invention that can be used to generate a preview image for an image to be printed on multiple pages. The user can specify an image scale factor in the scale field 405, and an overlap region in the overlap field 410. In this example, the horizontal overlap and vertical overlap are the same and they are both specified by the overlap field 410. A preview of the scaled image is displayed on a canvas 415 according to the image scale factor 405, the overlap region 410, and the physical characteristics of the page. The horizontal dimensions of the canvas 420 and the vertical dimensions of the canvas 425 are also indicated in the display.

Figure 5:
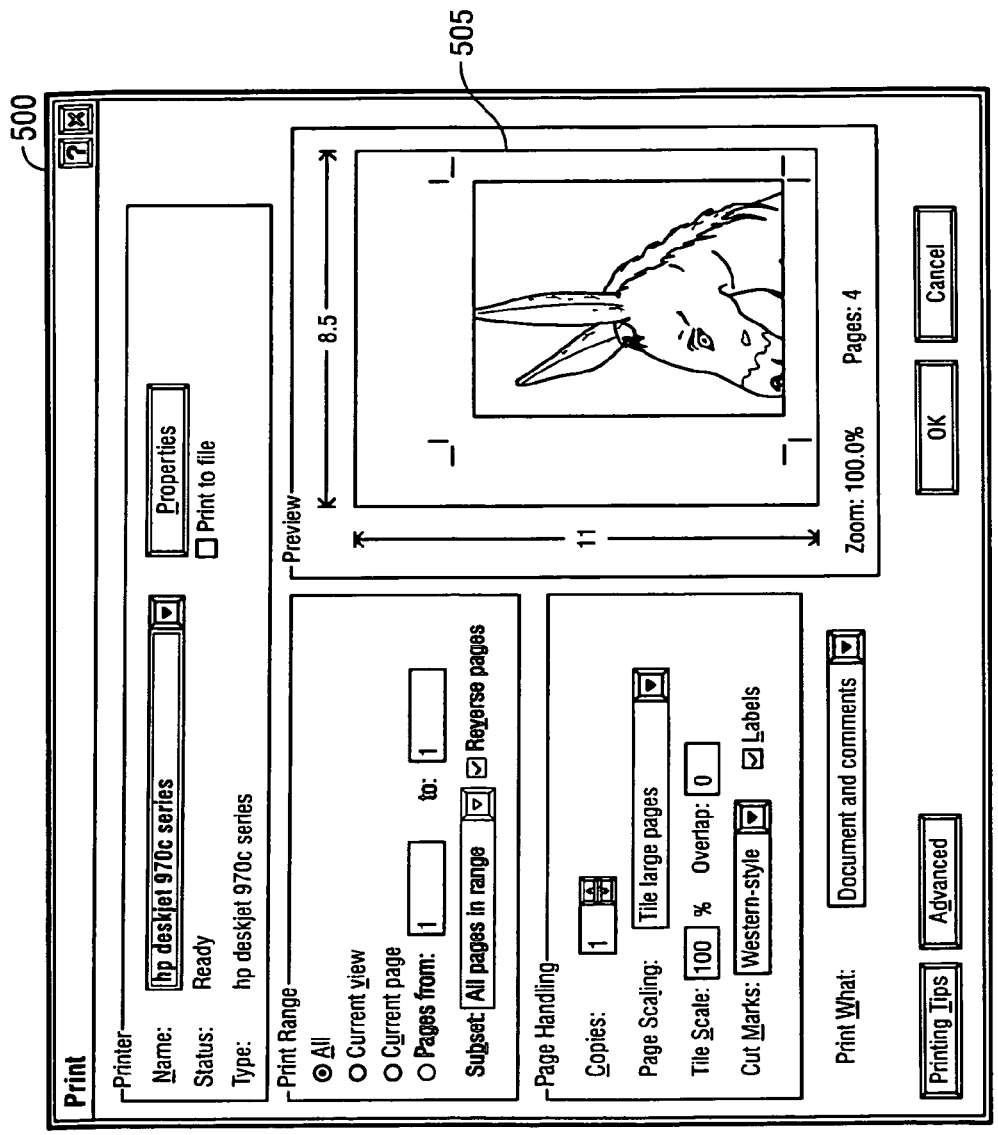
FIG. 5 illustrates a user interface of an exemplary print preview tool showing a section of the canvas as it would be printed on a page.

In FIG. 4, when the cursor is placed over the canvas 415 it changes to a (+) magnifying glass. The (+) magnifying glass is used to indicate to the user that he can zoom in on a section of the canvas and see that section of the canvas, as it would be printed on a single page. For example, if the user selects the upper left quadrant 430, the single page preview tool 500 illustrated in FIG. 5 is displayed. The canvas 505 in the single page preview tool 500 shows a selected portion of the canvas, containing a portion of the image content, as it would be printed on a page. The canvas 505 includes cut marks, slugs, alignment marks and shows the unprintable region of the paper. Placing the cursor over the canvas 505 changes it to a (−) magnifying glass. The (−) magnifying glass is used to indicate to the user that he can zoom out to view the image, as it would be printed on multiple pages, i.e. the view in FIG. 4.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims. For example, the steps of the invention can be performed in a different order and still achieve desirable results. The preview image displayed on the canvas 415 can include the cut marks, slugs, alignment marks and unprintable regions for each printed page. The user can display the cut marks, slugs, alignment marks and unprintable regions for a selected page on the canvas 415 by clicking on the selected page without zooming in on the selected page as in FIG. 5. The preview tool 500 can include navigation controls that allow the user to view different sheets of the printed document without having to zoom out to the preview tool 400 in order to select a different page.

What is claimed is:

1. A computer-implemented method of previewing an image mapped onto a two dimensional canvas to be rendered on multiple pages, the image as mapped onto the canvas being bigger than a page of the multiple pages in both horizontal and vertical dimensions, the method comprising:
   scaling the image;
   determining the number of pages required to render the image;
   calculating a preview scale factor;
   applying the preview scale factor to the scaled image to generate a preview image;
   generating a representation of a two dimensional canvas;
   mapping the preview image onto the representation of the two dimensional canvas; and
   rendering the preview image on the screen using the representation of the two dimensional canvas, wherein the representation of the two dimensional canvas shows how the image will be printed using multiple pages, and the preview image identifies one or more unprintable regions and one or more overlap regions.

2. The method of claim 1, wherein:
   displaying a representation of the two dimensional canvas includes displaying the horizontal and vertical dimensions of the two dimensional canvas.

3. The method of claim 1, wherein:
   displaying a representation of the two dimensional canvas includes displaying a representation of a page of the multiple pages, the page representation including a portion of the preview image and describing how the portion of the preview image will be rendered on the page.

4. The method of claim 3, wherein:
   the page representation includes one or more marks indicating how to combine the rendered page with one or more rendered pages associated with other portions of the preview image.

5. The method of claim 4, wherein:
   the one or more marks include cut marks, slugs, or alignment marks.

6. The method of claim 3, further comprising:
   receiving user input selecting a region of the two dimensional canvas representation in a user interface; and
   displaying a representation of a page associated with the selected region.

7. The method of claim 1, wherein:
   determining the number of pages required to render the image precedes scaling the image.

8. A computer-readable medium storing a computer executable program, for previewing an image mapped onto a two dimensional canvas to be rendered on multiple pages, the image as mapped onto the two dimensional canvas being bigger than a page of the multiple pages in both horizontal and vertical dimensions, the computer program product comprising instructions operable to cause data processing equipment to:
   scale the image;
   determine the number of pages required to render the image;
   calculate a preview scale factor;
   apply the preview scale factor to the scaled image to generate a preview image;
   generate a representation of a two dimensional canvas;
   map the preview image onto the representation of the two dimensional canvas; and
   render the preview image on the screen using the representation of the two dimensional canvas, wherein the representation of the two dimensional canvas shows how the image will be printed using multiple pages, and the preview image identifies one or more unprintable regions and one or more overlap regions.

9. The computer-readable medium of claim 8, wherein the instructions to display a representation of the canvas cause the data processing equipment to:
   display the horizontal and vertical dimensions of the-two dimensional canvas.

10. The computer-readable medium of claim 8, wherein the instructions to display a representation of the document cause the data processing equipment to:
    display a representation of a page of the multiple pages, the page representation including a portion of the preview image and describing how the portion of the preview image will be rendered on the page.

11. The computer-readable medium of claim 10, wherein the page representation includes one or more marks indicating how to combine the rendered page with one or more rendered pages associated with other portions of the preview image.

12. The computer-readable medium of claim 11, wherein the one or more marks include cut marks, slugs, or alignment marks.

13. The computer-readable medium of claim 10, further comprising instructions operable to cause data processing equipment to:
    receive user input selecting a region of the two dimensional canvas representation in a user interface; and
    display a representation of a page associated with the selected region.

14. The computer-readable medium of claim 8, wherein determining the number of pages required to render the image precedes scaling the image.

15. A system for previewing an image mapped onto a two dimensional canvas to be rendered on multiple pages, the image as mapped onto the canvas being bigger than a page of the multiple pages in both horizontal and vertical dimensions, the system comprising:

means for scaling the image;

means for determining the number of pages required to render the image;

means for calculating a preview scale factor;

means for applying the preview scale factor to the scaled image to generate a preview image;

means for generating a representation of a two dimensional canvas;

means for mapping the preview image onto the representation of the two dimensional canvas; and means for rendering the preview image on the screen using the representation of the two dimensional canvas, wherein the representation of the two dimensional canvas shows how the image will be printed using multiple pages, and the preview image identifies one or more unprintable regions and one or more overlap regions.

16. The system of claim 15, wherein:

displaying a representation of the two dimensional canvas includes means for displaying the horizontal and vertical dimensions of the two dimensional canvas.

17. The system of claim 15, wherein:

displaying a representation of the two dimensional canvas includes means for displaying a representation of a page of the multiple pages, the page representation including a portion of the preview image content and describing how the portion of the preview image content will be rendered on the page.

18. The system of claim 15, wherein:

the page representation includes one or more marks indicating how to combine the rendered page with one or more rendered pages associated with other portions of the preview image content.

19. The system of claim 15, wherein:

the one or more marks include cut marks, slugs, or alignment marks.

20. The system of claim 15, further comprising:

means for receiving user input selecting a region of the two dimensional canvas representation in a user interface; and means for displaying a representation of a page associated with the selected region.

21. The system of claim 15, where the means for determining the number of pages required to render the image precedes the means for scaling the image.

* * * * *

UNITED STATES PATENT AND TRADEMARK OFFICE
CERTIFICATE OF CORRECTION

| | |
|---|---|
| PATENT NO. | : 7,385,725 B1 |
| APPLICATION NO. | : 10/406332 |
| DATED | : June 10, 2008 |
| INVENTOR(S) | : David Sawyer |

It is certified that error appears in the above-identified patent and that said Letters Patent is hereby corrected as shown below:

Claim 1:
 column 5, line 48:
  delete "regions and one or more overlap regions.",
  and replace with --regions, each unprintable region representing a portion of the corresponding page that cannot be used by the printer to render the image, and one or more overlap regions, each overlap region being a portion of a printable region of a first page that is used to repeat image data from an adjacent second page.--

Claim 2:
 column 5, line 49:
  delete "wherein", and replace with --further comprising:-- column 5, line 51:
  delete "includes", and replace with --including--

Claim 3:
 column 5, line 53:
  delete "wherein", and replace with --further comprising:-- column 5, line 55:
  delete "includes", and replace with --including--

Claim 8:
 column 6, line 31:
  delete "regions and one or more overlap regions.",
  and replace with --regions, each unprintable region representing a portion of the corresponding page that cannot be used by the printer to render the image, and one or more overlap regions, each overlap region being a portion of a printable region of a first page that is used to repeat image data from an adjacent second page.--

UNITED STATES PATENT AND TRADEMARK OFFICE
CERTIFICATE OF CORRECTION

| | |
|---|---|
| PATENT NO. | : 7,385,725 B1 |
| APPLICATION NO. | : 10/406332 |
| DATED | : June 10, 2008 |
| INVENTOR(S) | : David Sawyer |

It is certified that error appears in the above-identified patent and that said Letters Patent is hereby corrected as shown below:

Claim 9:
    column 6, line 32:
        delete "wherein the", and replace with --further comprising-- column 6, line 33:
        delete "canvas", and replace with --two-dimensional canvas, the instructions operable to-- column 6, line 35:
        delete "the-two", and replace with --the two--

Claim 10:
    column 6, line 37:
        delete "wherein the", and replace with --further comprising-- column 6, line 38:
        delete "the instructions", and replace with --comprising instructions-- column 6, line 38:
        delete "document", and replace with --two-dimensional canvas, the instructions operable to--.

Claim 15:
    column 7, line 16:
        delete "regions and one or more overlap",
        and replace with --regions, each unprintable region-- column 7, line 17:
        delete "regions.",
        and replace with --representing a portion of the corresponding page that cannot be used by the printer to render the image, and one or more overlap regions, each overlap region being a portion of a printable region of a first page that is used to repeat image data from an adjacent second page.--

UNITED STATES PATENT AND TRADEMARK OFFICE
CERTIFICATE OF CORRECTION

| | |
|---|---|
| PATENT NO. | : 7,385,725 B1 |
| APPLICATION NO. | : 10/406332 |
| DATED | : June 10, 2008 |
| INVENTOR(S) | : David Sawyer |

It is certified that error appears in the above-identified patent and that said Letters Patent is hereby corrected as shown below:

Claim 16:
    column 7, line 18:
        delete "wherein:", and replace with --further comprising: means for-- column 7, line 20:
        delete "includes", and replace with --including--

Claim 17:
    column 7, line 23:
        insert --means for-- prior to "displaying"

column 7, line 24:
        delete "includes", and replace with --including--

Claim 18:
    column 8, line 5:
        delete "claim 15,", and replace with --claim 17,--

Claim 19:
    column 8, line 10:
        delete "claim 15,", and replace with --claim 18,--

UNITED STATES PATENT AND TRADEMARK OFFICE
CERTIFICATE OF CORRECTION

PATENT NO.         : 7,385,725 B1
APPLICATION NO. : 10/406332
DATED              : June 10, 2008
INVENTOR(S)        : David Sawyer It is certified that error appears in the above-identified patent and that said Letters Patent is hereby corrected as shown below:

Claim 20:
      column 8, line 13:
            delete "claim 15,", and replace with --claim 17,--

Signed and Sealed this

Seventeenth Day of February, 2009

JOHN DOLL
*Acting Director of the United States Patent and Trademark Office*